United States Patent [19]

Peck, Jr.

[11] Patent Number: 5,761,357
[45] Date of Patent: Jun. 2, 1998

[54] FIBER OPTIC "T" COUPLER IN-LINE SPLITTER

[75] Inventor: James L. Peck, Jr., Huntington Beach, Calif.

[73] Assignee: Boeing North American, Inc., Seal Beach, Calif.

[21] Appl. No.: 840,005

[22] Filed: Apr. 24, 1997

[51] Int. Cl.$^6$ .................................................. G02B 6/26
[52] U.S. Cl. .................... 385/44; 385/33; 385/34; 385/22; 359/636
[58] Field of Search .................... 385/44, 33, 34, 385/31, 19, 36, 32, 35, 15, 16, 17, 18, 22; 359/636

[56] References Cited

U.S. PATENT DOCUMENTS

| | | | |
|---|---|---|---|
| 4,078,852 | 3/1978 | Lebduska | 385/44 |
| 5,666,448 | 9/1997 | Schoenwald et al. | 385/44 |

*Primary Examiner*—Phan T. H. Palmer
*Attorney, Agent, or Firm*—Steven E. Kahm

[57] ABSTRACT

An optical coupler for use in fiber optics for splitting light signals into two or more portions wherein the intensity of the light on the outgoing optical fibers can be accurately controlled. The optical coupler consists of a sending GRIN lens and two or more adjacent receiving GRIN lenses wherein a portion of each receiving GRIN lens has been removed and the receiving GRIN lenses are attached along a common border formed by the removed portion of the GRIN lenses.

3 Claims, 2 Drawing Sheets

5,761,357

FIBER OPTIC "T" COUPLER IN-LINE SPLITTER

BACKGROUND OF THE INVENTION

1. Field of the invention

This invention relates to fiber optic couplers and more particularly to a fiber optic "T" coupler using cut off portions of GRIN lens.

2. Description of the related art

In the past bundles of optic fibers were fused together so that an incoming light signal on one fiber could be split onto two or more outgoing optic fibers. The process for fusing the optic fibers together is cumbersome and does not accurately divide the incoming light to the outgoing optic fibers.

SUMMARY OF THE INVENTION

A sending GRIN lens is optically coupled to two receiving GRIN lenses. The sending GRIN lens has a focused end and a collimated end. The focused end receives light on an optic fiber and collimated light leaves at the collimated end. There are two receiving GRIN lenses having a focused end and a collimated end. The collimated ends are for receiving the collimated light from the sending GRIN lens. The receiving GRIN lenses focus the collimated light at the focused end and transmit the light out on optic fibers. The receiving GRIN lenses are cut such that a chord line along the length of the GRIN lenses form a border plane at which the receiving GRIN lenses are attached. The receiving GRIN lenses receive light from the sending GRIN lens in proportion to the surface area of their collimated ends in optical contact with the collimated end of the sending GRIN lens. Thus the intensity of the light on each receiving GRIN lens can be accurately controlled.

OBJECTS OF THE INVENTION

It is an object of the invention to accurately split the incoming light signal on an optic fiber into two or more portions for transmission on outgoing optic fibers.

Other objects, advantages and novel features of the present invention will become apparent from the following detailed description of the invention when considered in conjunction with the accompanying drawing.

DETAILED DESCRIPTION OF THE PREFERRED EMBODIMENT

Figure 1:
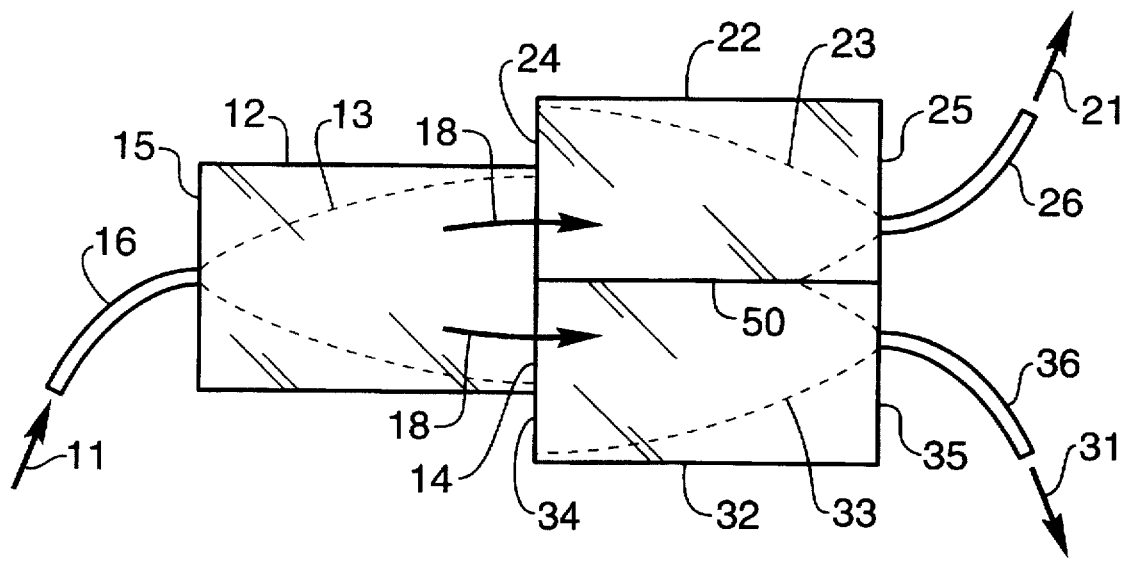
FIG. 1 is a top view of the fiber optic "T" coupler in-line splitter.
Figure 2:
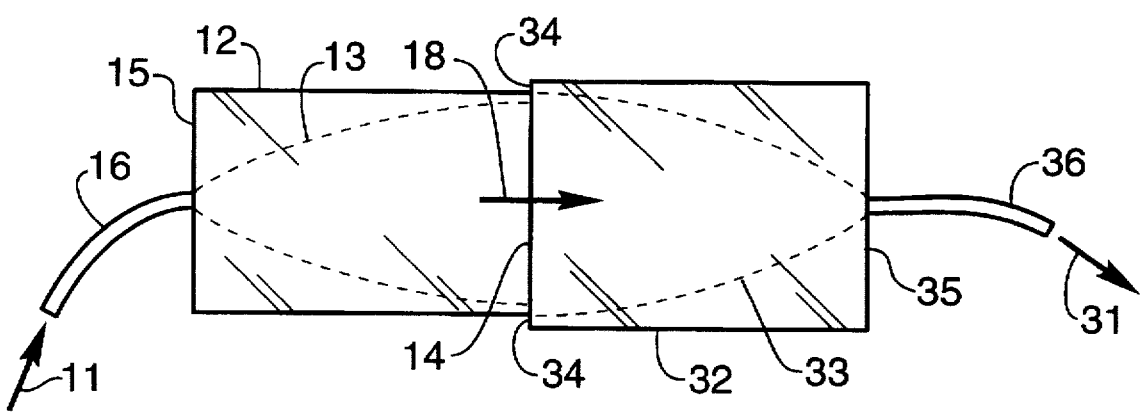
FIG. 2 is a side view of the fiber optic "T" coupler in-line splitter.
Figure 5:
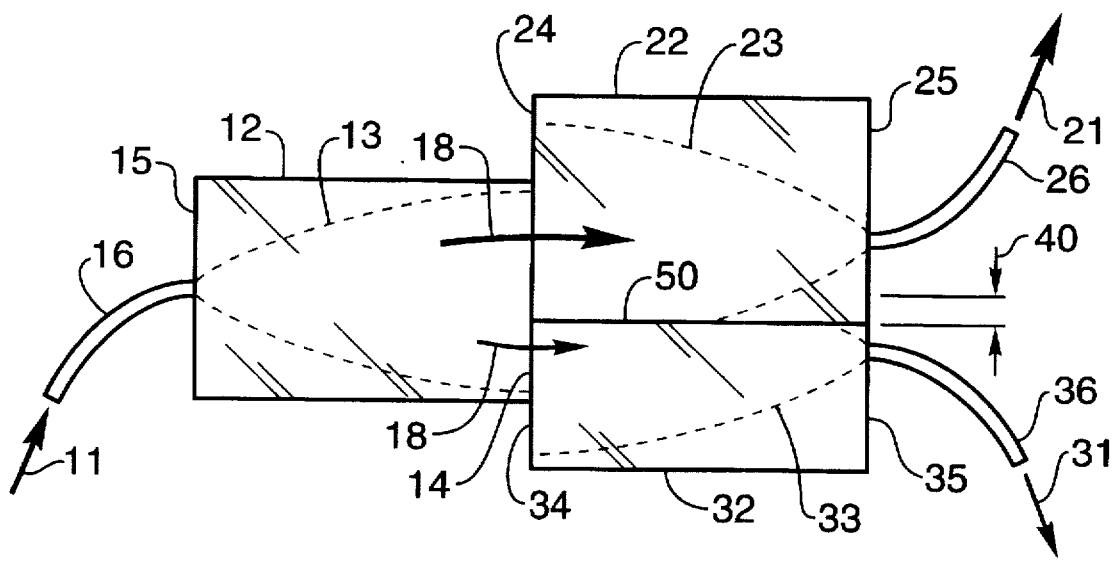
FIG. 5 is a top view of the fiber optic "T" coupler in-line splitter with the border offset from center.

FIG. 1 shows a light signal 11 traveling in optic fiber 16 to the focused end 15 of GRIN lens 12. The GRIN lens 12 is preferably a quarter wave length GRIN lens such that the light signal 11 entering the focused end 15 of GRIN lens 12 travels in the optical envelope 13 and exits as collimated light 18 at the collimated end 14 of GRIN lens 12. Adjacent to and optically connected with the collimated end 14 of GRIN lens 12 are the collimated ends 24 and 34 of GRIN lenses 22 and 32 respectively. The collimated light 18 from GRIN lens 12 partly goes to GRIN lens 22 and partly to GRIN lens 32. The ratio of how much light goes to which GRIN lens is directly proportional to the surface area of the collimated end 14 of GRIN lens 12 covered by the collimated ends 24 and 34 of GRIN lenses 22 and 32 respectively. For example, in FIG. 5, GRIN lens 12 is moved downward compared to the embodiment in FIG. 1. The collimated end 14 of GRIN lens 12 is covered more by the collimated end 24 of GRIN lens 22 than the collimated end 34 of GRIN lens 32, therefore more collimated light 18 enters GRIN lens 22 than GRIN lens 32. The relative percentages of light split off from the incoming light signal 11 can thus be controlled simply and accurately by moving the GRIN lens 12 relative to the border line 50 of the adjacent GRIN lenses 22 and 32.

The collimated light 18 after entering the GRIN lenses 22 and 32 at collimated ends 24 and 34 is focused by the GRIN lens at focused ends 25 and 35 respectively and exits the GRIN lenses 25 and 35 on optic fibers 26 and 36 as light signals 21 and 31.

A means of adjusting the position of GRIN lens 12 relative to the border line 50 of GRIN lenses 22 and 32 (not shown) makes an adjustable output of light signals 21 and 31.

Figure 3:
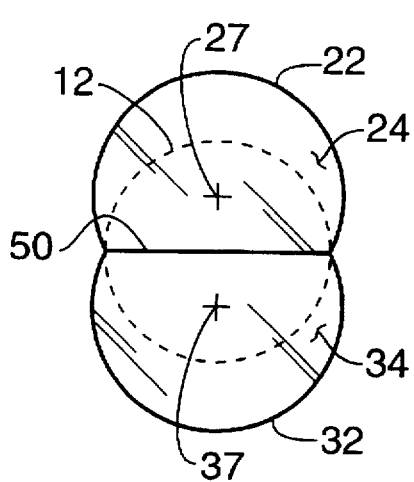
FIG. 3 is an end view of the fiber optic "T" coupler in-line splitter with equal sized receiving GRIN lenses.

FIG. 3 shows end views of the collimated ends 24 and 34 of two equal sized GRIN lenses 22 and 32 respectively. The dotted line shows the circumference of GRIN lens 12. Thus the entire output of light from GRIN lens 12 is input to either GRIN lens 22 or GRIN lens 32. The optical centers of GRIN lenses 22 and 32 are shown by optical centers 27 and 37 respectively. The GRIN lenses in this embodiment are shown cut to the same size with the optical centers close to the border line 50 and centered within the circumference of GRIN lens 12 such that they each receive equal amounts of light from optic fiber 16.

Figure 4:
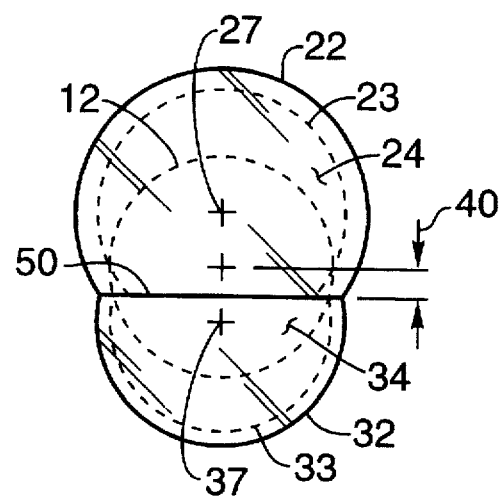
FIG. 4 is an end view of the fiber optic "T" coupler in-line splitter with different sized receiving GRIN lenses.

As shown in FIG. 4, GRIN lens 22 may be larger than GRIN lens 32, resulting in a larger portion of GRIN lens 22 being adjacent to GRIN lens 12. The portion of light entering GRIN lens 22 is greater than the portion entering GRIN lens 32. Thus adjusting the relative size of the receiving GRIN lenses 22 and 32 is another way of adjusting the split of the light intensities on optic fibers 26 and 36.

It should be understood that two GRIN lenses are shown adjacent to GRIN lens 12 in this embodiment but that any number of GRIN lenses can be adjacent to GRIN lens 12 to split the incoming light signal 11 into as many parts and intensities as desired.

GRIN lenses 22 and 32 may be regularly made GRIN lenses which have been cut at border 50 and attached to each other at border 50. The border 50 is a chordal plane parallel to the optical centers 27 and 37 of the GRIN lenses 22 and 32, and offset from the optical axis of GRIN lens 12 by distance 40.

Light in the GRIN lenses 22 and 32 tends to stay close to the optic centers 27 and 37. The border 50 reflects the light in the GRIN lenses back toward the optic centers 27 and 37 of GRIN lenses 22 and 32 respectively such that there is little crossing of the border 50. However, if the light crossing the border is going both ways and is of a known amount, then the light intensities of the output light signals 21 and 31 are therefor adjustable to the desired levels.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A fiber optic coupler comprising:

a first GRIN lens having a collimated end and a focused end, a second GRIN lens having a collimated end, a focused end and an optical center, the second GRIN lens cut along a chord parallel to the optical center of the second GRIN lens to form a planar border area, a third GRIN lens having a collimated end, a focused end and an optical center, the third GRIN lens cut along a chord parallel to the optical center of the third GRIN lens to form a planar border area, wherein the planar border areas of the second GRIN lens and the third GRIN lens are adjacent, the collimated ends of the second GRIN lens and the third GRIN lens are adjacent and optically connected to the collimated end of the first GRIN lens such that collimated light from the first GRIN lens is transmitted to the collimated ends of the second and third GRIN lenses.

2. A fiber optic coupler as in claim 1 wherein:

the collimated end of the first GRIN lens is smaller than the combined collimated ends of the second and third GRIN lenses so that all of the light leaving the collimated end of the first GRIN lens is received by the collimated ends of the second and third GRIN lenses.

3. A fiber optic coupler as in claim 1 wherein:

an optic fiber is connected to the focused end of each of the GRIN lenses for transmitting light signals to and from the GRIN lenses.

\* \* \* \* \*